United States Patent
Howcroft (10) Patent No.: US 8,640,176 B2
(45) Date of Patent: Jan. 28, 2014

(54) APPARATUS AND METHOD FOR PROVIDING TELEVISION SERVICES USING AN AGGREGATOR

(75) Inventor: Jerald Robert Howcroft, Beverly Hills, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 559 days.

(21) Appl. No.: 11/355,361

(22) Filed: Feb. 16, 2006

(65) Prior Publication Data

US 2007/0192807 A1 Aug. 16, 2007

(51) Int. Cl.
*H04N 7/173* (2011.01)

(52) U.S. Cl.
USPC .......... 725/86; 725/87; 725/89; 725/100; 725/105; 725/109; 725/110; 725/131; 725/139; 725/151

(58) Field of Classification Search
USPC ......... 725/86–87, 91, 131, 139, 144, 89, 100, 725/105, 109–110, 151
See application file for complete search history.

(56) References Cited

U.S. PATENT DOCUMENTS

| | | | |
|---|---|---|---|
| 5,861,883 A | 1/1999 | Cuomo et al. | |
| 5,987,454 A | 11/1999 | Hobbs | |
| 6,021,433 A | 2/2000 | Payne et al. | |
| 6,308,329 B1 | 10/2001 | Takahashi | |
| 6,335,736 B1 | 1/2002 | Wagner et al. | |
| 6,785,902 B1 * | 8/2004 | Zigmond et al. | 725/38 |
| 6,961,723 B2 | 11/2005 | Faybishenko et al. | |
| 2003/0050959 A1 | 3/2003 | Faybishenko et al. | |
| 2003/0126120 A1 | 7/2003 | Faybishenko et al. | |
| 2005/0108637 A1 * | 5/2005 | Sahota et al. | 715/526 |
| 2005/0267973 A1 | 12/2005 | Carlson et al. | |
| 2005/0276570 A1 | 12/2005 | Reed, Jr. et al. | |
| 2006/0143664 A1 * | 6/2006 | Hartselle et al. | 725/88 |
| 2006/0173985 A1 * | 8/2006 | Moore | 709/223 |
| 2006/0177200 A1 * | 8/2006 | Deutmeyer et al. | 386/98 |
| 2006/0277316 A1 * | 12/2006 | Wang et al. | 709/231 |
| 2007/0083468 A1 * | 4/2007 | Wetherell | 705/51 |
| 2007/0162945 A1 * | 7/2007 | Mills | 725/119 |

OTHER PUBLICATIONS

PCT Search Report for International Patent Application No. PCT/US2007/062320, pp. 1-2, mailed Nov. 9, 2007.
PCT Written Opinion of the International Searching Authority for International Patent Application No. PCT/US2007/062320, pp. 1-5, mailed Nov. 9, 2007.

* cited by examiner

*Primary Examiner* — Mulugeta Mengesha
(74) *Attorney, Agent, or Firm* — Jackson Walker L.L.P.

(57) ABSTRACT

The present disclosure provides an apparatus, method, and computer programs for obtaining content from a communications network. One aspect of the disclosure includes: storing an aggregator on a Set Top Box (STB) associated with a television set, wherein the aggregator is adapted to obtain content corresponding to a plurality of feeds from a communications network; displaying the plurality of feeds on the television set in response to a first input received by the STB; accepting at the STB a selection of at least one feed from the plurality of feeds; obtaining content from the communications network corresponding to the selected at least one feed; and providing the obtained content for display on the television set.

24 Claims, 7 Drawing Sheets

APPARATUS AND METHOD FOR PROVIDING TELEVISION SERVICES USING AN AGGREGATOR

BACKGROUND OF THE DISCLOSURE

1. Field of the Disclosure

The present disclosure relates to the field of provision of television services over a television network 2. Background Television services provided over a television network, such as an Internet Protocol Television (IPTV) network, cable network or satellite network, provide various content such as content over multiple channels, Video-on-Demand (VoD), Voice over Internet Protocol (VoIP), data from the Internet, etc., to users over a broadband connection. The broadband connection typically terminates at a Set Top Box (STB) located at a user premise. The STB may be coupled to a television set as well as to additional devices, such as a Digital Video Recorder (DVR). A DVR is a device that records video to a digital storage medium, such as a hard disk, in digital form, thereby enabling a user to record a show at a given time to be played back at another time, pause live TV shows, and skip advertising, among other things. In addition to the multiple content available, IPTV provides various features to a user's viewing experience, such as an ability to purchase items through a television set, an integration of television viewing and Internet usage, interactive games, etc.

Real Simple Syndication (RSS) is a family of XML file formats for web syndication using, among other things, new websites and weblogs. The technology of RSS allows Internet users to subscribe to websites that have content provided over RSS feeds. These websites are typically sites that change or add content regularly. To use this technology, site owners create or obtain specialized software (such as a content management system) which, in the machine-readable XML format, presents new articles in a list, giving a line or two of each article and a link to the full article or post. In addition to facilitating syndication, RSS allows a website's frequent readers to track updates on the site using an aggregator.

Current television services typically limited to channel selection, program recording, ordering of VoD content, etc. Thus, there is a need to provide enhanced content for viewing and interactivity via a set top box connected to a television set.

BRIEF DESCRIPTION OF THE DRAWINGS

For detailed understanding of the present disclosure, references should be made to the following detailed description of an exemplary embodiment, taken in conjunction with the accompanying drawings, in which like elements have been given like numerals, wherein.

DETAILED DESCRIPTION OF THE DISCLOSURE

In view of the above, the present disclosure through one or more of its various aspects and/or embodiments is presented to provide one or more advantages, such as those noted below.

The present disclosure provides an apparatus, method, and computer programs for obtaining content from a communications network. In one aspect the disclosure provides a computer-readable medium accessible to a processor for executing instructions contained in a computer program embedded in the computer readable medium, wherein the computer program includes: instructions to store an aggregator to obtain content corresponding to a plurality of feeds from a communications network; instructions to display the plurality of feeds on a television set in response to a first input; instructions to select at least one feed from the plurality of feeds in response to a second input; instructions to obtain content corresponding to the selected feed from the communications network using the aggregator; and instructions to display the obtained content on the television set.

In another aspect, the computer program includes instructions to store the obtained content on a storage medium associated with an STB. In another aspect, the computer program includes instructions to access the storage medium for display on the television set in response to a third input. In another aspect, the obtained content is syndicated content that is automatically updated over a time period. In another aspect, the aggregator obtains the content over Transmission Control Protocol/Internet Protocol (TCP/IP). In another aspect, the obtained content may be one of video, voice, and data. The obtained content may include content in an XML format.

Another aspect of the disclosure provides a method for providing a television service that includes: storing an aggregator on a Set Top Box (STB) associated with a television set, wherein the aggregator is adapted to obtain content corresponding to a plurality of feeds from a communications network; displaying the plurality of feeds on the television set in response to a first input received by the STB; accepting at the STB a selection of at least one feed from the plurality of feeds; obtaining content from the communications network corresponding to the selected at least one feed; and providing the obtained content for display on the television set.

In another aspect, the method further includes storing the obtained content on a storage medium associated with the STB. The storage medium may include one of a digital video recorder, a hard disk, and a Compact Disc Read-Only Memory (CD-ROM). In another aspect, the method further includes accessing the storage medium for providing the obtained content for display on the television set in response to a second input. In another aspect, the obtained content may include syndicated content that is updated over a time period. Another aspect of the method includes obtaining the content over Transmission Control Protocol/Internet Protocol (TCP/IP). The obtained content may include one of video, voice, and data. In another aspect, obtaining content includes obtaining the content by the aggregator in an Extensible Markup Language (XML) format.

Another aspect of the disclosure provides an apparatus for displaying content obtained over a communications network on a television set. The apparatus includes: a processor; a first computer program including an aggregator, accessible to the processor, to obtain content corresponding to a plurality of feeds from the communications network; and a second computer program, accessible to the processor. The second computer program includes: instructions to display the plurality of feeds on the television set in response to a first input; instructions to select at least one feed from the plurality of feeds in response to a second input; instructions to obtain content corresponding to the selected feed from the network using the aggregator; and instructions to display the obtained content on the television set. In another aspect, the apparatus further includes a storage device that stores the obtained content. The storage device may include one of a digital video recorder, a hard disk, and a Compact Disc Read-Only Memory (CD-ROM). In another aspect of the apparatus, the second computer program further comprises instructions for storing the obtained content at the storage device. In another aspect of the apparatus, the second computer program further comprises instructions to provide the obtained content for display on the television set from the storage device in response to a third input.

In another aspect, the apparatus further includes a first interface adapted to be coupled to the television set to provide the obtained content to the television set; and a second interface adapted to obtain content from the communications network. In another aspect, the apparatus is integral to the television set. In another aspect, the obtained content may include syndicated content that is updated over a time period. In another aspect, the aggregator obtains the content over Transmission Control Protocol/Internet Protocol (TCP/IP). In another aspect, the obtained content may be one of video, voice, and data. In another aspect, the obtained content includes content in an XML format.

Figure 1:
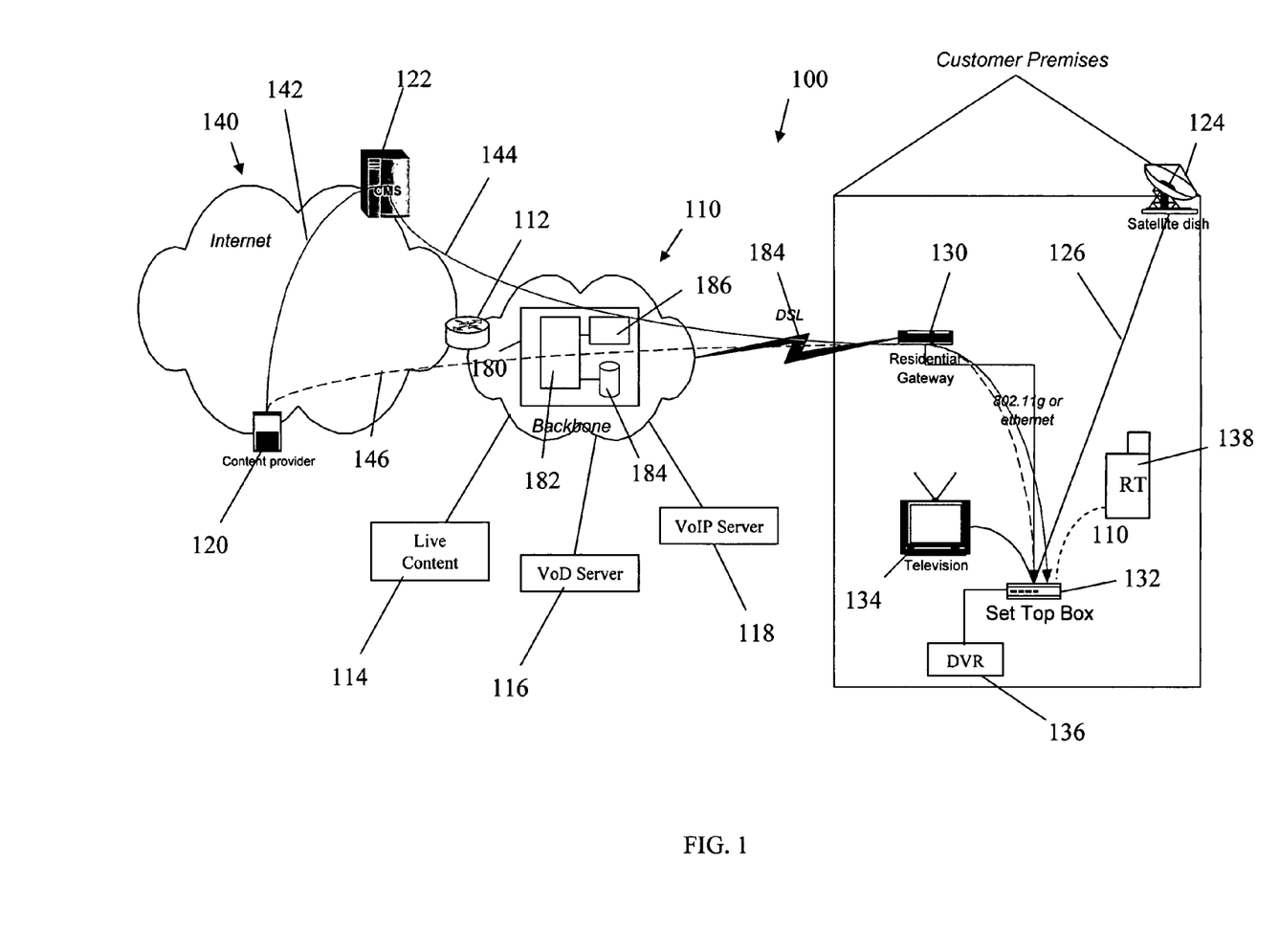
FIG. 1 shows an exemplary high-level functional diagram of a network for providing Internet Protocol Television services according to one embodiment of the present disclosure.

FIG. 1 shows an exemplary high-level functional diagram of a network 100 for providing IPTV services according to one embodiment of the present disclosure. The network 100 is shown to include a backbone 110 that may be coupled to the Internet 140 via one or more routers, such as a router 112. The backbone may provide at least one of IPTV services, cable service, and satellite services to a user as well as content available through these services. Such content includes video content, audio content such as Voice over Internet Protocol (VoIP), and data content. The backbone also may include a variety of servers, routers and transport links. The backbone 110 is shown coupled to a live television content provider 114 that may include multiple television channels, such as is commonly delivered over television networks. The backbone 110 also is shown to include a Video-on-Demand (VoD) server 116 that provides Video-on-Demand to users. The backbone 110 is also shown to include a Voice over Internet Protocol (Voice over IP, or VoIP) server 118 that provides telephony service over a packet-switched network using an appropriate protocol, such as VoIP. The backbone 110 is shown coupled via a Digital Subscriber Line (DSL) 184 to a customer gateway, such as a modem 130, which may be coupled to set-top-box (STB), such as STB 132, that is connected to television (TV) set 134. Although only one STB is shown, more than one STB may be used at a customer premise. The backbone may additionally couple to the STB via a cable connection to a cable STB or via a satellite connection to a satellite dish located at the customer location and linked to the STB over physical link 126. An STB may act as a control interface for the associated TV set and may be accessed by remote control, such as remote control 138 accesses STB 132. In addition, a recording device, such as Digital Video Recorder (DVR) 136 may be connected to an STB, such as STB 132, for the purpose of recording video content such as television content, VoD, etc. The recording device may be a separate device from the STB and connected via physical link or may be a module integrated into the STB. For the purposes of the disclosure, a DVR is discussed, but it is understood that the disclosure may be applied to any suitable recording device.

Still referring to FIG. 1, the backbone network 110 includes a system 180 that includes one or more servers 182, a database 184 that stores user information, and a set of computer programs 186 which contain instructions that are executed by the server 182 to perform the methods and functions described herein. The user information stored in the database 184 may include settings related to operations of one or more STBs at a user location. These settings may include content recording capabilities, parental control of content available to users at a TV set, a list of favorite channels or most commonly visited channels ('Favorites') of a user, as well as information related to broadband and voice service, including VoIP, and credit card numbers that may be charged for interactive activity by the user, such as for buying merchandise, downloading videos, settling accounts, etc. In one aspect, the database 184 may store settings related to an STB, and these settings may be applied to content at the backbone 110. In another aspect, the STB may store the settings and the server 182 may receive the settings from the STB at a given time, such as on a scheduled basis or upon request by the server 182 and store the settings in the database 184. In yet another aspect, settings for the STB may be shared between the database and the STB. The settings may be associated to the STB by an IP address, an identifier associated with the STB, or any other suitable identifier.

The Internet 140 is further shown to be coupled to a content provider 120 for providing content, generally syndicated content. The content provider distributes a feed of content to one or more aggregating devices. An aggregating device operates software that retrieves syndicated web content. An aggregator is able to subscribe to a feed, check the feed for updates, and retrieve the content from the feed. The aggregator provides a consolidated view of the content in a single browser display or desktop application. The user may subscribe to a feed from a STB and select content from one or more feeds for viewing. The syndicated content that an aggregator obtains is usually supplied in the form of Real Simple Syndication (RSS) or other XML-based formats. Content may include video files (i.e., wm10, mpeg2, mpeg4 files, etc.), audio files (i.e., mp3, wma files, etc.) and text files (i.e., html, txt files, etc.), among other content. In one aspect, the aggregator may be located at the STB and is generally obtained by the user at the STB. In another aspect, the aggregator may be located at a location in the network. The content at a content provider generally relates to a category that may be of interest to a user, such as football news, music videos, science headlines, etc. In one aspect, when content is recorded to the content provider, the content provider 120 provides the aggregating device with a clickable link to the content. When the user clicks on the link, the selected content is provided to the user. In another aspect, the content provider may supply the content to the aggregator automatically upon the content being recorded at the content provider.

The Internet is further shown to be coupled to a Content Management Server (CMS) 122 that provides and manages a catalog of content available to a network user. In one aspect, the CMS may display a list of content including a sample portion of the content and a link to the full content. As an example, the CMS may display a news headline, a few lines of text, and a link to the full article. The CMS 122 may be located at any place in the network, such as the Internet 140 or the backbone 110. In one aspect, the CMS may manage and provide a standard feed of content, such as weather information, stock tickers, etc., to the STB 130. In another aspect, the CMS presents a list of network feeds to which a user may subscribe, such as a feed from content provider 120. The content provider may provide the CMS with a selection of titles, categories, or content via connection 142. The CMS may then provide a list of content categories to the user over connection 144 to the STB 132. For example, the content provider may be a Disney web server, and the CMS may receive categories of content to which a user may subscribe from Disney (i.e., films, TV shows, biographies, etc.). The STB displays the list of channels at TV set 134. The user subscribes to content by selecting the content at the STB 132, which then sends a signal over connection 146 to the content provider 120.

Figure 2:
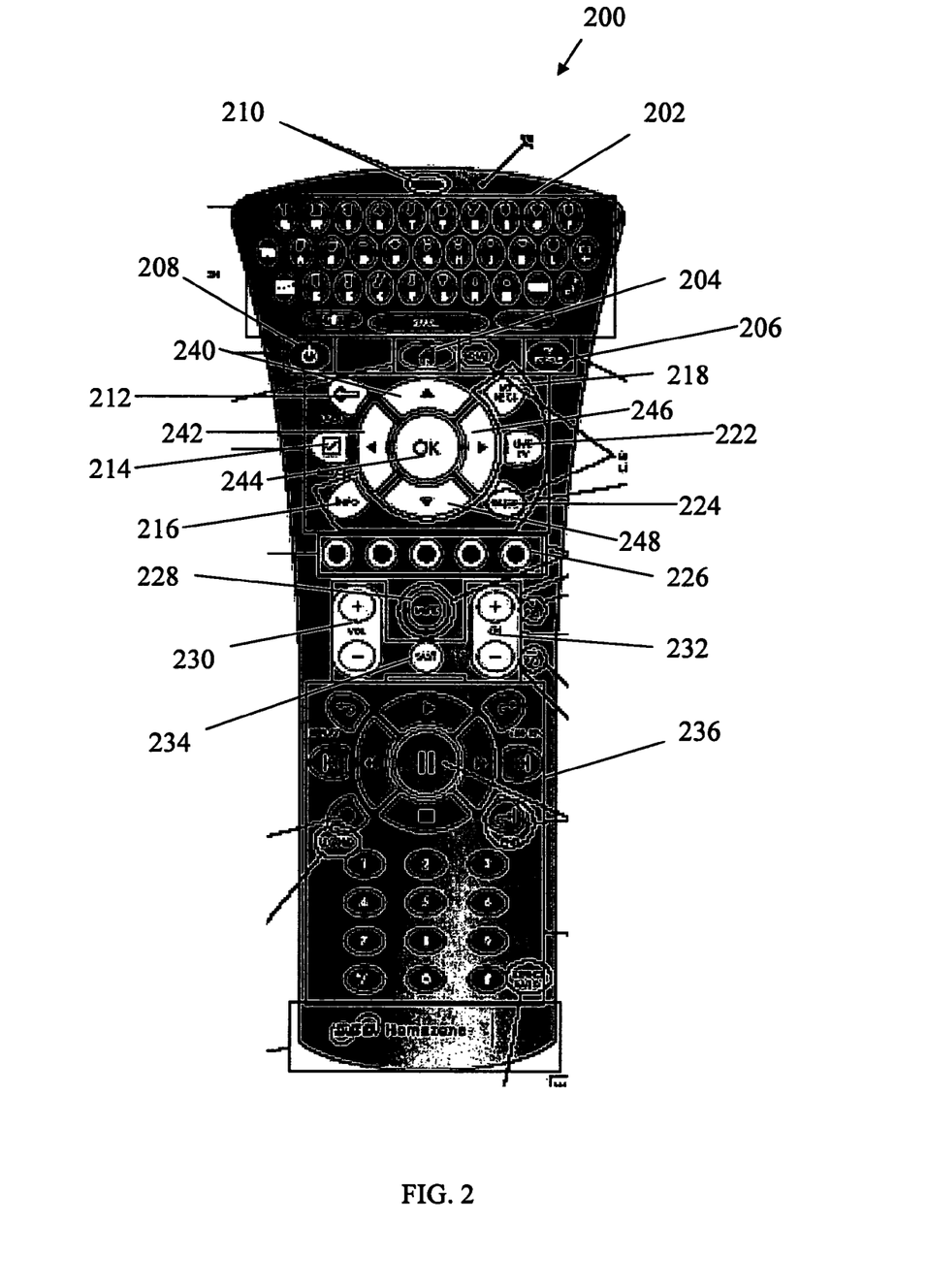
FIG. 2 shows an exemplary remote control device that may be used to interact with a set top box to perform one aspect of the present disclosure.

FIG. 2 shows an exemplary remote control device 200 that may be used to interact with an STB to perform one aspect of the present disclosure. The exemplary remote control device may be used to provide input to the STB. The STB interacts with the remote control device and performs a function in response to input from the remote control device, such as providing television content, recording content, enabling purchasing of items through a TV set, enabling text entry to a web page displayed at a TV set, channel navigation and selection, menu navigation, changing TV settings such as brightness, etc. Interactive signals are transmitted to the STB through a light port 210 at the remote control device. Keypad 202 is used for text entry at the television interface. Power button 206 turns CPE devices on and off and the standby button 208 may be used to converse power usage at the TV. Keys used for menu navigation and selection are shown, including a set of keys for navigating up 240, down 248, left 242, and right 246 through menu selections at a TV screen. An OK key 244 is provided for making a selection; a BACK button 212 enables a user to reverse a previous menu selection; and a SELECT button 214 enables a user to select an item using a checkbox format at the television interface. An INFORMATION button 216 provides metadata for changing TV settings. MY RECORDINGS button 218 enables a user to obtain recording from a DVR, LIVE TV button 222 returns a user to TV programming, and GUIDE button 234 produces an electronic programming guide at the TV set. The remote control device also provides a standard set of switches, such as a volume control 230, a mute button 228, a channel selector 232 that enables a user to switch from a current channel to a numerically adjacent channel, and a LAST button 234 for returning to the previous channel selection. Also provided are keys 236 for operating a recording device such as a DVR, and for inputting numbers to a STB, such as when a user selects a channel.

The remote control also provides a set of color-coded "smart" keys 226 that may be used to perform multiple functions at the STB. In one aspect, the smart keys enable a user to select an item at a television interface through color-coordination of the key with the item. A display at the TV may provide selections that are encoded using a color. For example, an item may be shown in red or situated on a red tile or some other display uniquely connecting the item to the color 'red.' Using the color-coded keys, the user presses the smart key having the same color uniquely identifying the item selected at the screen. The remote control device further includes a 'Home Zone' button 204 that, when pressed, enables the STB to present a screen (e.g., a 'Home Menu' screen) for accessing several aspects of the disclosure. The Home Zone screen presents multiple categories, for example, by photos, movies, TV shows, and subscribed content.

Figure 3:
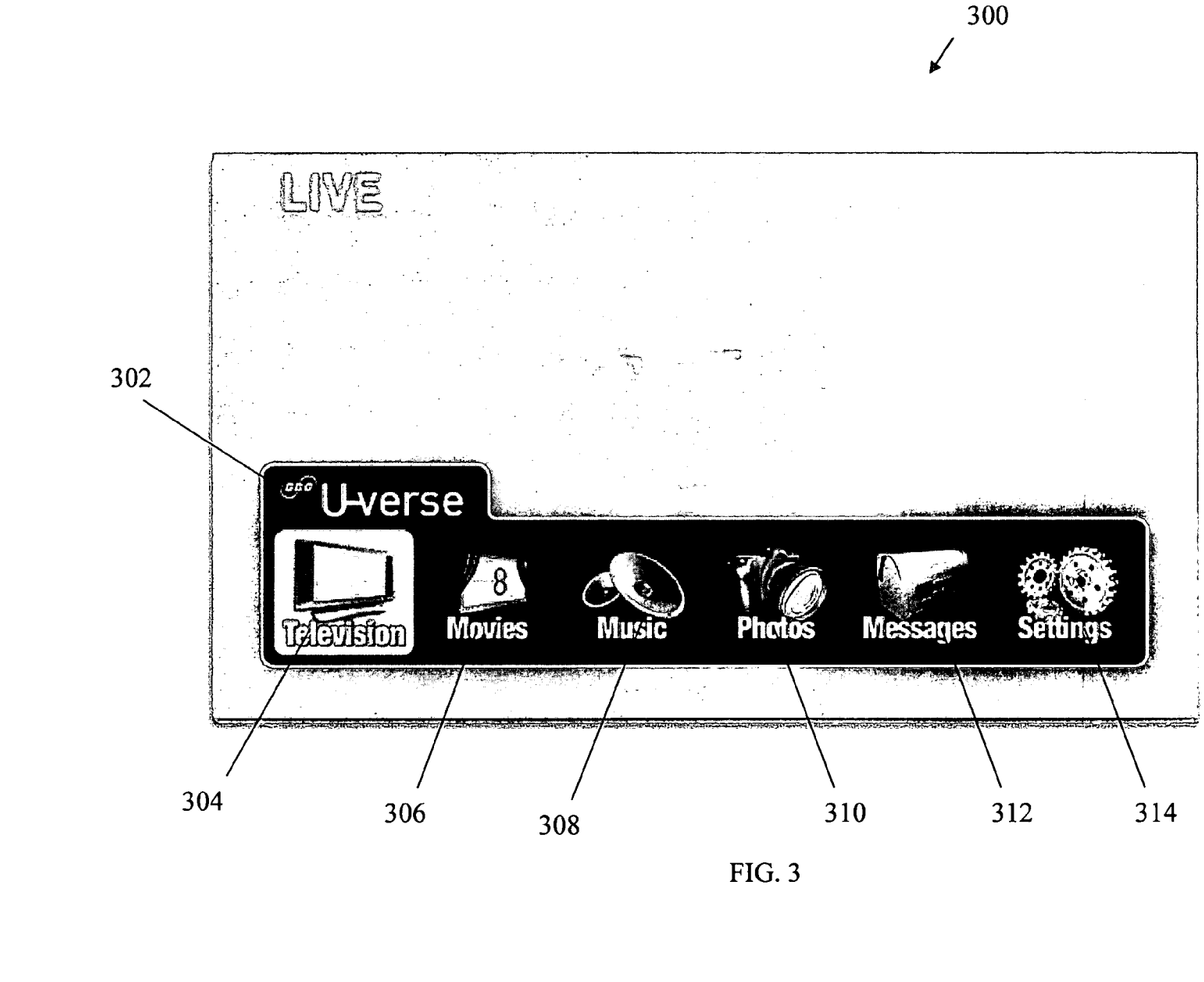
FIG. 3 shows an exemplary screen shot that may provide links at a set top box to various categories of user content.
Figure 7:
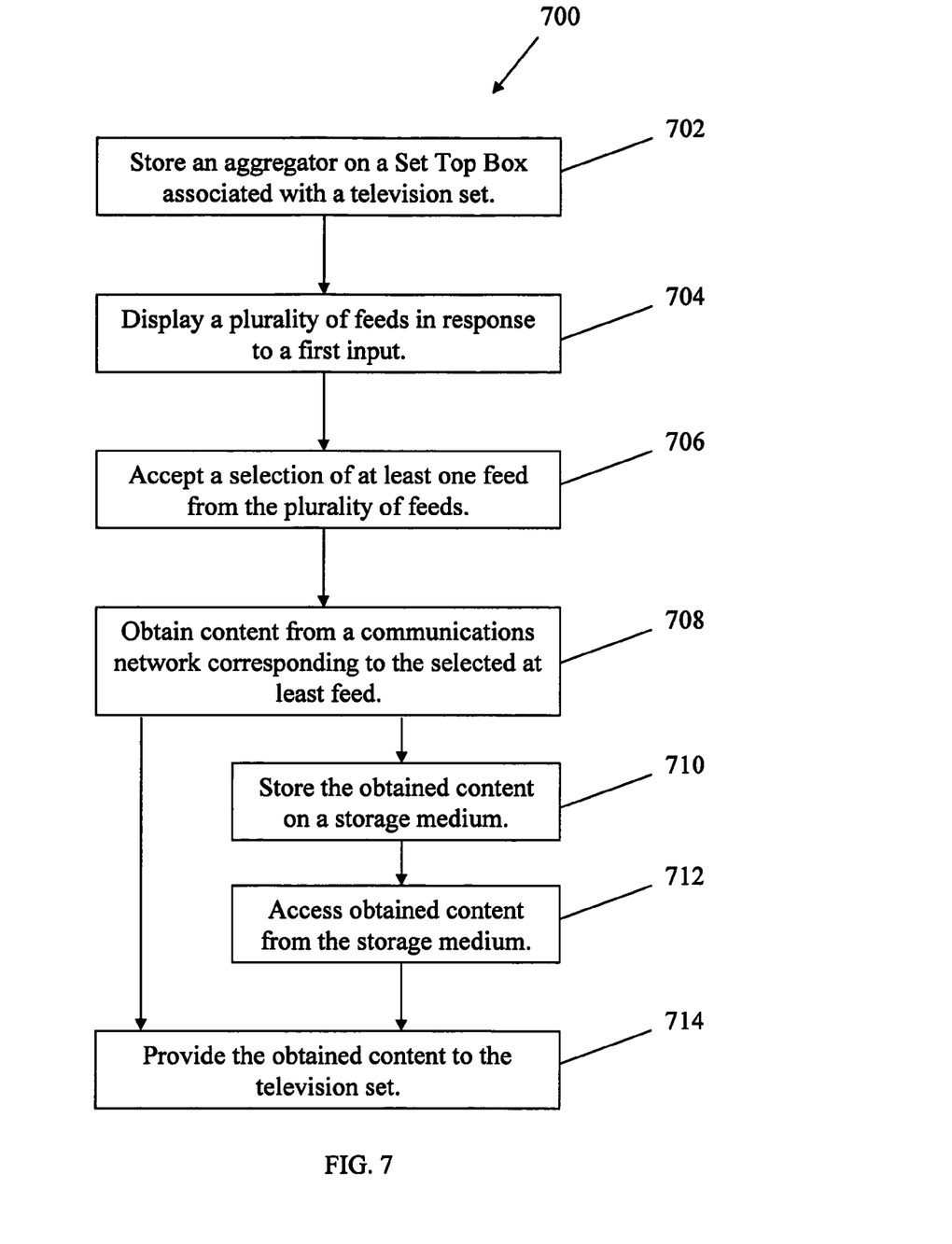
FIG. 7 shows a flowchart of a method of obtaining content from a communications network according to one aspect of the present invention.

FIG. 3 shows an exemplary screenshot 300 (i.e., a Home Menu screen) that may provide links at an STB to various categories of user content. The screen is generally displayed when the user pushes the Home Zone button 204 on the remote control device. The screen 300 includes a menu bar 302 providing various categories, such as a television category 304, a movies category 306, a music category 308, and photo category 310. The user may select a category by using the remote control device using, for example, smart keys 226. Selecting an RSS/My Internet link 312 may provide a screen enabling a user to subscribe to content. A My Settings selection 314 provides a direct link to a standard set of subscription content such as is shown in FIG. 7.

Figure 4:
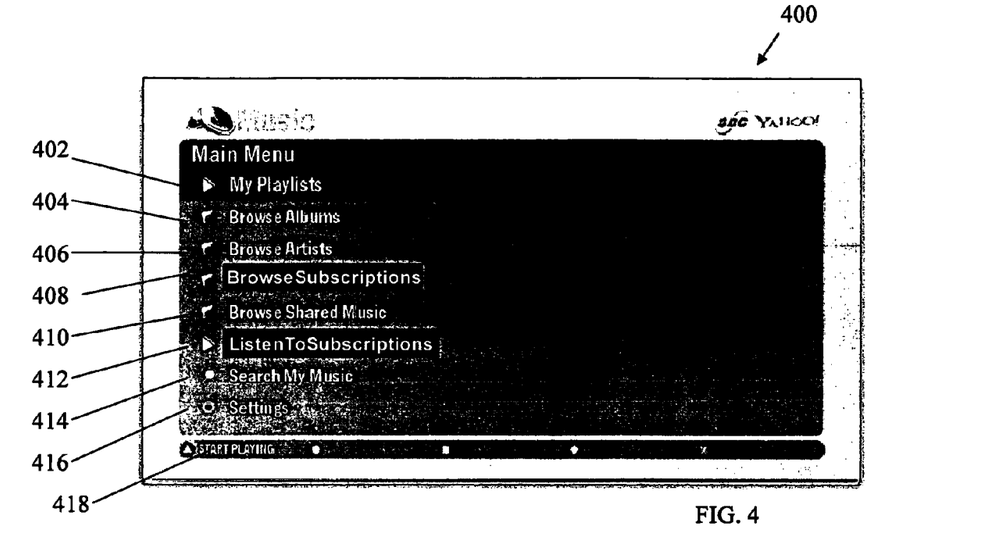
FIG. 4 shows an exemplary screen shot enabling a user to access content at a set top box that may be recorded, purchased, obtained through subscription, etc.

FIG. 4 shows an exemplary screenshot 400 enabling a user to access content at an STB that may be recorded, purchased, obtained through subscription, etc. The exemplary screen 400 is displayed when the music category 308 is selected in FIG. 3. In one aspect, the screen provides options for locating musical selections disposed on a local hard drive or a t a storage device in the network, such as by viewing a personal playlist ("My Playlist") 402, Browse Albums 404, and Browse Artists 406. The user may additionally perform a search for music using a selection criterion ('Search My Music' 414). In another aspect, the program enables a user to browse subscriptions to syndicated content by selecting Browse Subscriptions 408. The user may additionally listen to music that has been obtained through subscription by selecting Listen to Subscriptions 412. The screen 400 includes a set of controls 418 for playing a musical selection.

Figure 5:
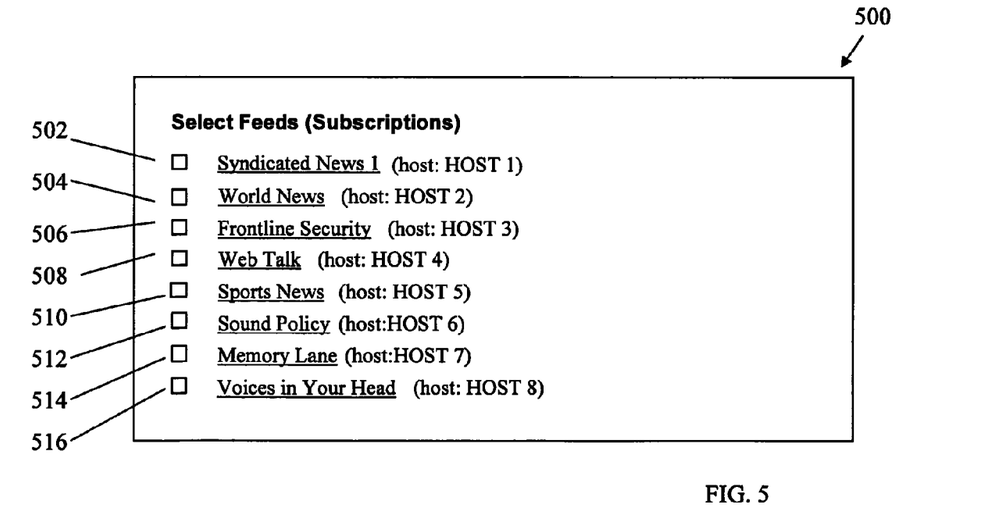
FIG. 5 shows an exemplary screen shot that displays a table of feeds for obtaining content from the Internet.

FIG. 5 shows an exemplary screenshot 500 that displays a table of feeds for obtaining content from the Internet. The screen 500 may be arrived at, for example, when a user selects 'Browse Subscriptions' 408 at the screen 400 of FIG. 4. The exemplary subscription screen 500 displays subscriptions to Syndicated News 1 522, Worlds News 524, Frontline Security 526, Web Talk 528, Sports News 530, Sound Policy 532, Memory Lane 534, and Voices in Your Head 536, which may be provided by one or more content providers. A user may select to view contents of a subscription by placing a check at the box preceding the subscription name or by selecting the subscription using smart keys.

Figure 6:
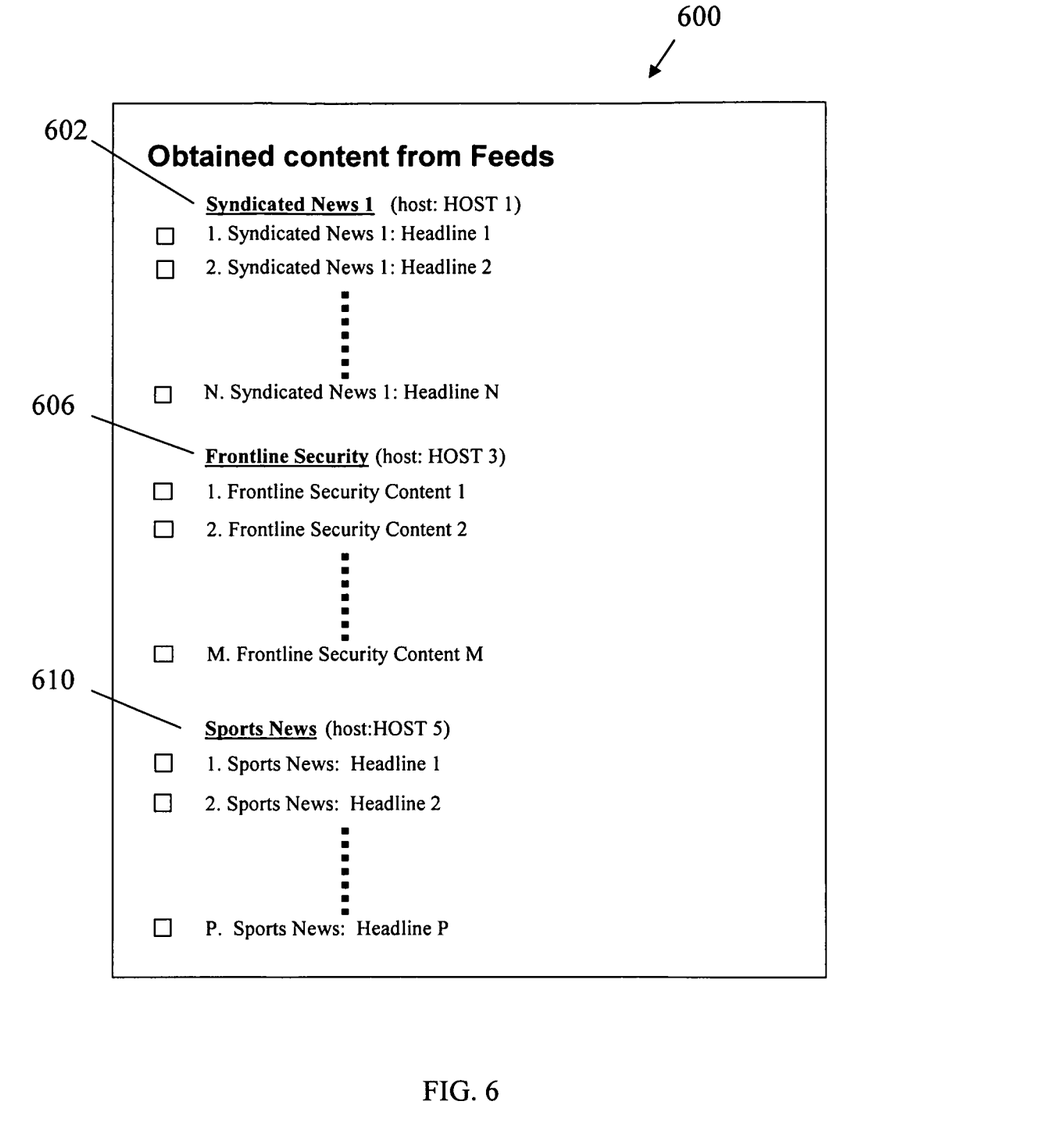
FIG. 6 shows an exemplary screen that shows content provided to the user by the associated content feeders.

FIG. 6 shows an exemplary screenshot showing the feeds for obtaining content from the network. For example, the screen 600 displays Syndicated News 602 and recently posted content (News Headlines 1 . . . M); and Frontline Security 606 and recently posted content (Audio Files 1 . . . N) and Sports News 610 and recently posted content (Sports Headlines 1 . . . P). A user may select content by placing a check at the box preceding the content name or by selecting the content using smart keys.

FIG. 7 shows a flowchart of a method of obtaining content from a communications network according to one aspect of the present invention. In Box 702, an aggregator is stored on an STB associated with a television set. In Box 704, a plurality of feeds is displayed to the television set in response to a first input. In Box 706, a selection of at least one of the feeds from the plurality of feeds is accepted 708. In Box 710, content that corresponds to the selected feed is obtained from the communications network. In one aspect, the obtained content is provided to the television set 714. In another aspect, the obtained content is stored to a storage medium, such as a DVR, hard disk, CD-ROM, etc (Box 710). The obtained content is accessed from the storage medium in Box 712 and then provided to the television set in Box 714.

Figure 8:
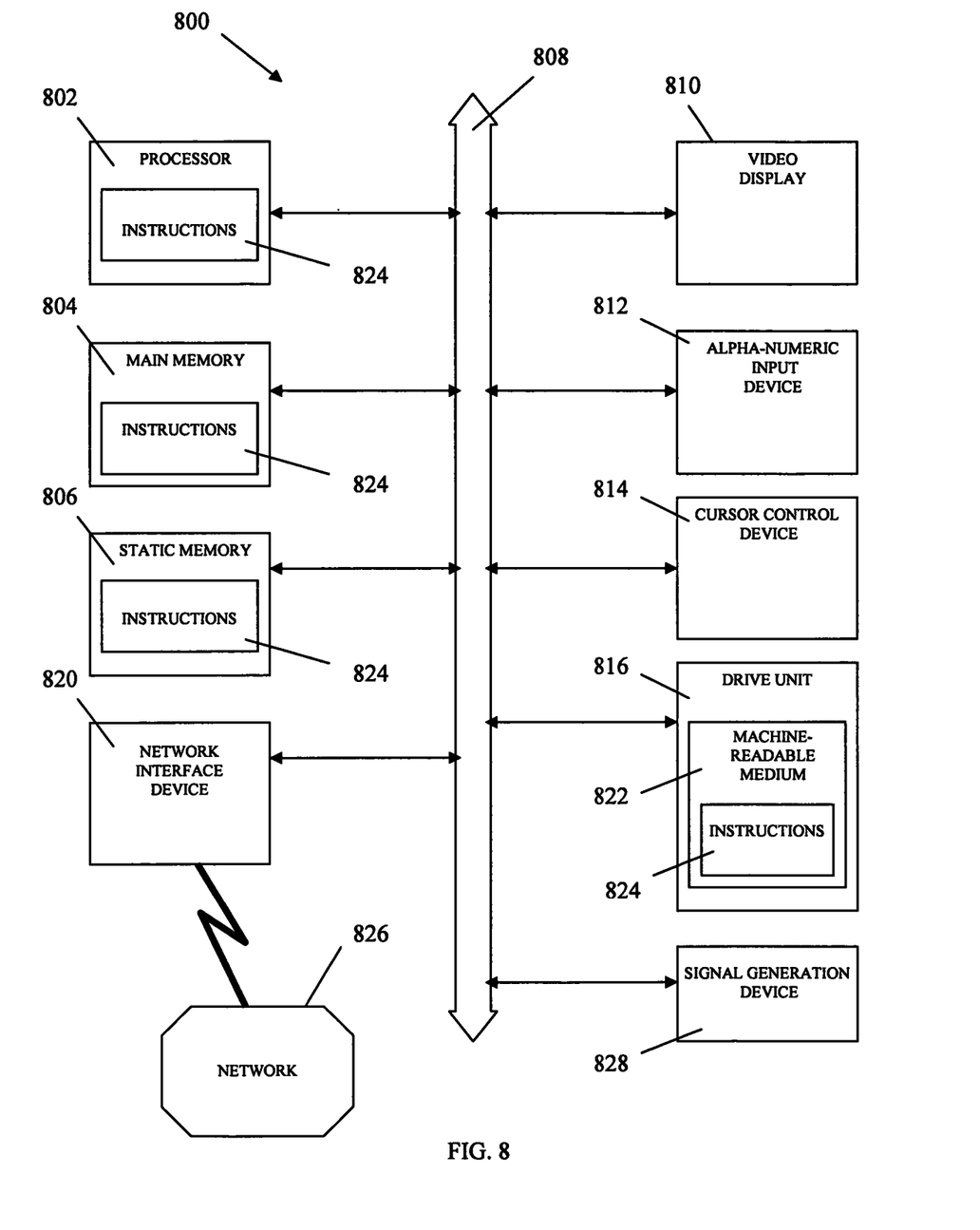
FIG. 8 is a diagrammatic representation of a machine in the form of a computer system within which a set of instructions, when executed, may cause the machine to perform any one or more of the methodologies discussed herein.

FIG. 8 is a diagrammatic representation of a machine in the form of a computer system 800 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated in herein above. The instructions 824 may also reside, completely or at least partially, within the main memory 804, the static memory 806, and/or within the processor 802 during execution thereof by the computer system 800. The main memory 804 and the processor 802 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium as listed herein and including art-recognized equivalents and successor media, in which the software implementations herein are stored.

Although, the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "disclosure" merely for convenience and without intending to voluntarily limit the scope of this application to any single disclosure or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-readable memory, accessible to a processor, including processor executable program instructions, which upon execution by the processor, cause the processor to perform operations, comprising:
   obtaining, by a set top box, live television content from a first source via an IP communications network;
   obtaining, by the set top box, web feed content from a second source via the IP communications network;
   aggregating, by the set top box, the web feed content obtain from the second source;
   displaying a home menu interface including a first link to the live television content and a second link to the web feed content;
   responsive to user selection of the second link, displaying a table of a plurality of syndicated web feeds on a television set;
   responsive to user selection indicating a selected syndicated web feed from the plurality of syndicated web feeds, displaying a menu of web feed content items associated with the selected syndicated web feed on the television set; and
   displaying the web feed content items on the television set.

2. The computer-readable memory of claim 1, wherein the operations include storing the web feed content on a storage medium of the set top box.

3. The computer-readable memory of claim 2, wherein the operations include accessing the storage medium to display the web feed content items stored on the television set.

4. The computer-readable memory of claim 1, wherein the web feed content is automatically updated over a time period.

5. The computer-readable memory of claim 1, wherein the web feed content is one of video, voice, and data.

6. The computer-readable memory of claim 1, wherein the web feed content further comprises content in an Extensible Markup Language (XML) format.

7. The computer readable memory of claim 1, wherein the web feed aggregator includes a real simple syndication client.

8. A set top box apparatus, comprising:
   a processor; and
   a computer readable memory, accessible to the processor, including processor executable instructions that, when executed by the processor, cause the processor to perform operations comprising:
      obtaining live television content from a first source via an IP communications network;
      obtaining web feed content from a second source via the IP communications network;
      aggregating the web feed content obtained from the second source;
      displaying a home menu interface including a first link to the live television content and a second link to the web feed content;
      responsive to user selection of the second link, displaying a table of the plurality of syndicated web feeds on a television set;
      responsive to user selection indicating a selected syndicated web feed from the plurality of syndicated web feeds, displaying a menu of web feed content items associated with the selected syndicated web feed on the television set; and
      displaying the web feed content items on the television set.

9. The apparatus of claim 8 wherein obtaining the web feed content includes obtaining syndicated web feed content.

10. The apparatus of claim 9, wherein the computer readable memory is one of a digital video recorder, a hard disk, and a CD-ROM.

11. The apparatus of claim 8, wherein the operations include storing the web feed content to the computer readable memory.

12. The apparatus of claim 11, wherein displaying the web feed content items includes accessing the web feed content stored in the storage device.

13. The apparatus of claim 8, further comprising: a first interface adapted to be coupled to the television set to provide the web feed content to the television set; and a second interface adapted to obtain content from the communications network.

14. The apparatus of claim 8, wherein the syndicated web feed content is updated over a time period.

15. The apparatus of claim 8, wherein the communications network over which the aggregator obtains said web feed content and said live television content comprises an Internet protocol television network.

16. The apparatus of claim 8, wherein the web feed content is one of video, voice, and data.

17. The apparatus of claim 8, wherein the web feed content includes content in an XML format.

18. A method, comprising:
   obtaining, by a set top box, live television content from a first source via an IP communications network;
   obtaining, by the set top box, web feed content, from a second source via the IP communications network;
   aggregating, by the set top box, the web feed content obtained from the second source;
   displaying a home menu interface including a first link to the live television content and a second link to the web feed content;
   responsive to user selection of the second link, displaying a table of a plurality of syndicated web feeds on a television set;
   responsive to user selection indicating a selected syndicated web feed from the plurality of syndicated web feeds, displaying a menu of web feed content items associated with the selected syndicated web feed on the television set; and
   displaying the web feed content items on the television set.

19. The method of claim 18 further comprising storing the web feed content on a storage medium associated with the set top box.

20. The method of claim 19 further comprising accessing the storage medium for the obtained web feed content for display on the television set.

21. The method of claim 19, wherein the storage medium is one of a digital video recorder, a hard disk, and a CD-ROM.

22. The method of claim 18, wherein the web feed content is updated over a time period.

23. The method of claim 18, wherein the IP communications network comprises an Internet protocol television network.

24. The method of claim 18, wherein the web feed content includes one of video, voice, and data.

* * * * *